United States Patent
Li et al.

(10) Patent No.: US 9,432,257 B2
(45) Date of Patent: Aug. 30, 2016

(54) TRAFFIC BEHAVIOR DRIVEN DYNAMIC ZONING FOR DISTRIBUTED TRAFFIC ENGINEERING IN SDN

(71) Applicant: Huawei Technologies Co., Ltd., Shenzhen (CN)

(72) Inventors: Xu Li, Nepean (CA); Petar Djukic, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 14/142,344

(22) Filed: Dec. 27, 2013

(65) Prior Publication Data

US 2015/0188767 A1 Jul. 2, 2015

(51) Int. Cl.
*H04L 12/28* (2006.01)
*H04L 12/24* (2006.01)

(52) U.S. Cl.
CPC ......... *H04L 41/0823* (2013.01); *H04L 41/042* (2013.01); *H04L 41/12* (2013.01); *H04L 41/0816* (2013.01)

(58) Field of Classification Search
CPC .................................................... H04L 12/28
USPC ........................................................ 370/254
See application file for complete search history.

(56) References Cited

U.S. PATENT DOCUMENTS

| | | | |
|---|---|---|---|
| 6,370,142 B1 * | 4/2002 | Pitcher et al. | 370/390 |
| 6,636,721 B2 * | 10/2003 | Threadgill et al. | 455/12.1 |
| 9,038,151 B1 * | 5/2015 | Chua | G02F 21/31 709/223 |
| 2002/0178424 A1 | 11/2002 | Gupta et al. | |
| 2005/0050197 A1 | 3/2005 | Boyd et al. | |
| 2005/0256972 A1 * | 11/2005 | Cochran et al. | 709/245 |
| 2008/0096503 A1 | 4/2008 | Economy et al. | |

(Continued)

FOREIGN PATENT DOCUMENTS

| | | |
|---|---|---|
| CN | 102594697 A | 7/2012 |
| CN | 102882719 A | 1/2013 |
| CN | 103051565 A | 4/2013 |

OTHER PUBLICATIONS

Abbasi, A.A. et al., "A Survey on Clustering Algorithms for Wireless Sensor Networks," Computer Communications, Science Direct, vol. 30, No. 14-15, May 24, 2007, 16 pages.

(Continued)

*Primary Examiner* — Wei Zhao
(74) *Attorney, Agent, or Firm* — Slater Matsil, LLP

(57) ABSTRACT

System and method embodiments are provided for traffic behavior driven dynamic zoning for distributed traffic engineering (TE) in software defined networking (SDN). In an embodiment, a method in a network component for dynamic zoning for TE in SDN includes receiving at the network component network information from at least one SDN controller from a plurality of SDN controllers in a network; determining with the network component a plurality of TE zones for the network, selecting a local zone TE controller for each of the plurality of TE zones, and selecting a master TE controller according to the network information and a zoning scheme, wherein the local zone TE controller and the master TE controller are selected form one of the SDN controllers; and transmitting with the network component an indication of the local zone TE controllers, zone membership, and the master controllers to at least some of the SDN controllers.

60 Claims, 5 Drawing Sheets

(56) References Cited

U.S. PATENT DOCUMENTS

| | | |
|---|---|---|
| 2009/0327902 A1 | 12/2009 | Bethune et al. |
| 2013/0034104 A1 | 2/2013 | Yedavalli et al. |
| 2013/0250802 A1 | 9/2013 | Yalagandula et al. |
| 2013/0283374 A1 | 10/2013 | Zisapel et al. |
| 2015/0188837 A1 | 7/2015 | Djukic et al. |
| 2015/0200859 A1 | 7/2015 | Li et al. |

OTHER PUBLICATIONS

Agarwal, S. et al., "Traffic Engineering in Software Defined Networks," 2013 Proceedings of IEEE INFOCOM, Apr. 14, 2013, 9 pages.

Arora, S. et al.,"Geometry, Flows, and Graph-Partitioning Algorithms," Communications of the ACM, vol. 51, No. 10, Oct. 2008, 10 pages.

Chiang, M. et al., "Layering as Optimization Decomposition: A Mathematical Theory of Network Architectures," Proceedings of the IEEE, vol. 95, No. 1, Jan. 2007, 58 pages.

Chinchuluun, A. et al., "Multilevel (Hierarchical) Optimization: Complexity Issues, Optimality Conditions, Algorithm," Advances in Applied Mathematics and Global Optimization, vol. 17, Chapter 6, Feb. 26, 2009, 25 pages.

Duchi, J.C. et al., "Dual Averaging for Distributed Optimization: Convergence Analysis and Network Scaling," IEEE Transactions on Automatic Control, vol. 57, No. 3, Mar. 2012, 15 pages.

Elsner, U., "Graph Partitioning a Survey," Technische Universität Chemnitz, Dec. 1997, 58 pages.

Fiduccia, C.M. et al., "A Linear-Time Heuristic for Improving Network Partitions," 19th Conference on Design Automation, Jun. 14-16, 1982, 7 pages.

"GLPK (GNU Linear Programming Kit)," GLPK—GNU Project—Free Software Foundation (FSF), <https://www.gnu.org/software/glpk/> stable release 4.54, Mar. 28, 2014, last accessed Feb. 25, 2015, 2 pages.

"Graph Partition," Wikipedia: The Free Encyclopedia, Wikimedia Foundation, Inc.,<http://en.wikipedia.org/wiki/Graphpartition>, Jan. 15, 2015, last accessed Feb. 25, 2015, 5 pages.

Hendrickson, B. et al., "A Multilevel Algorithm for Partitioning Graphs," Proceedings of the IEEE/ACM SC95 Conference, Article No. 28, 1995, 14 pages.

Karypis, G. et al., "A Fast and High Quality Multilevel Scheme for Partitioning Irregular Graphs," 1998 Society for Industrial and Applied Mathematics, vol. 20, No. 1, 34 pages.

Kernighan, B.W. et al., "An Efficient Heuristic Procedure for Partitioning Graphs," Bell Systems Technical Journal, vol. 49, Sep. 30, 1969, 18 pages.

Krauthgamer ,R. et al., "Partitioning Graphs into Balanced Components," SODA '09 Proceedings of the Twentieth Annual ACM-SIAM Symposium on Discrete Algorithms, 2009, 8 pages.

Li, C.S. et al., "Software Defined Networks," IEEE Communications Magazine, Guest Editorial, vol. 51, No. 2, Feb. 2013.

McSherry, F., "Spectral Partitioning of Random Graphs," In Proceedings of the 42nd IEEE Symposium on Foundations of Computer Science (FOCS), Oct. 8-11, 2001, 9 pages.

"METIS—Serial Graph Partitioning and Fill-reducing Matrix Ordering," <http://glaros.dtc.umn.edu/gkhome/views/metis> Web. Feb. 25, 2015, 1 page.

Orlowski, S. et al., "The Effect of Hop Limits on Optimal Cost in Survivable Network Design," Telecommunications Planning: Innovations in Pricing, Network Design and Management, vol. 33, Chapter 8, Jun. 8, 2004, 15 pages.

Schmid, S. et al., "Exploiting Locality in Distributed SDN Control," Proceedings of the Second ACM SIGCOMM Workshop on Hot Topics in Software Defined Networking, Aug. 16, 2013, 6 pages.

Tabak, E.K. et al., "Improving the Performance of Independent Task Assignment Heuristics MinMin, MaxMin and Sufferage," IEEE Transactions on Parallel & Distributed Systems, vol. 25, No. 5, May 2014, 14 pages.

Yu, J.Y. et al., "A Survey of Clustering Schemes for Mobile AD Hoc etworks," IEEE Communications Surveys, The Electronic Magazine of Original Peer-Reviewed Survey Articles, www.comsoc.org/pubs/surveys, First Quarter 2005, vol. 7, No. 1, 17 pages.

Danna, E., et al., "A Practical Algorithm for Balancing the Max-Min Fairness and Throughput Objectives in Traffic Engineering," 2012 Proceedings IEEE INFOCOM, Mar. 25-30, 2012, 9 pages.

International Search Report and Written Opinion of the International Searching Authority received in Patent Cooperation Treaty Application No. PCT/US2015/10638 mailed Apr. 8, 2015, 10 pages.

International Search Report and Written Opinion of the International Searching Authority received in Patent Cooperation Treaty Application No. PCT/CN2014/094900 mailed Apr. 3, 2015, 12 pages.

\* cited by examiner

US 9,432,257 B2

TRAFFIC BEHAVIOR DRIVEN DYNAMIC ZONING FOR DISTRIBUTED TRAFFIC ENGINEERING IN SDN

TECHNICAL FIELD

The present invention relates to a system and method for traffic engineering in networks, and, in particular embodiments, to a system and method for distributed traffic engineering in software defined networks.

BACKGROUND

Software defined networking (SDN) decouples traffic management (i.e., the control plane) from traffic forwarding (i.e., the data plane). In the control plane, SDN manages the network resources (e.g., how to use them) and controls network traffic flows (e.g., where to send them) jointly by a central SDN controller. Traffic flows have diversified Quality of Experience (QoE) and Quality of Service (QoS) requirements (e.g., rate, delay, delay jitter, outage, buffering time, etc.), depending on their nature (e.g., video) and/or application (e.g., video conferencing or downloading, etc.). The SDN controller has the responsibility to engineer traffic, that is, to plan routes for traffic flows and allocate resources (e.g., capacity, spectrum, power, etc.) along the routes, jointly so that their QoE/S requirements are met efficiently and effectively. This is normally an optimization problem.

Currently, the SDN traffic engineering (TE) optimization problem is solved by a central SDN controller. Supporting information is collected at the SDN controller. For example, nodes report their status (e.g., loading, resource availability, resource quality, coverage, etc.) and their incidental links status (e.g., remaining capacity, buffer size, spectral efficiency (SE), etc.). The computation logic for the TE optimization problem is executed at the SDN controller and provisioning is made by the SDN controller. The SDN controller delivers TE's resource allocation decision to the related nodes.

However, fully centralized TE implies hardware complexity, high communication overhead, and provisioning delay. The SDN controller needs powerful computing module to handle the large-scale optimization; otherwise, the computational capability limitations of the SDN controller would cause large computation delay. Furthermore, global information collection and provisioning occupy a large bandwidth and incur large end-to-end network delays. Therefore, improved systems and methods for TE optimization in SDN is desirable.

SUMMARY

In accordance with an embodiment, a method in a network component for dynamic zoning for traffic engineering (TE) in software defined networking (SDN) includes receiving at the network component network information from at least one SDN controller from a plurality of SDN controllers in a network; determining with the network component a plurality of TE zones for the network, selecting a local zone TE controller for each of the plurality of TE zones, and selecting a master TE controller according to the network information and a zoning scheme, wherein the local zone TE controller is selected from one of the SDN controllers, and wherein the master TE controller is selected from one of the SDN controllers; and transmitting with the network component an indication of the zone composition, the local zone TE controllers, and the master controllers to at least some of the SDN controllers.

In accordance with an embodiment, a network component for dynamic zoning for traffic engineering (TE) in software defined networking (SDN) includes a processor and a computer readable storage medium storing programming for execution by the processor, the programming including instructions to: receive network information from at least one SDN controller from a plurality of SDN controllers in a network; determine a plurality of TE zones for the network, selecting a local zone TE controller for each of the plurality of TE zones, and selecting a master TE controller according to the network information and a zoning scheme, wherein the local zone TE controller is selected from one of the SDN controllers, and wherein the master TE controller is selected from one of the SDN controllers; and transmitting an indication of the zone composition, the local zone TE controllers, and the master controllers to at least some of the SDN controllers.

In accordance with an embodiment, a method in a zoning controller for dynamic zoning of a network for traffic engineering (TE) in software defined networking (SDN) includes receiving at the zoning controller network zoning information from at least some of a plurality of SDN controllers in the network; partitioning with the zoning controller the network into a plurality of zones, selecting a master controller from the plurality of SDN controllers, and selecting a plurality of local zone TE controllers from the plurality of SDN controllers, wherein each local zone TE controller corresponds to a respective one of the plurality of zones; transmitting from the zoning controller an installation command to at least one zone TE controller; and receiving at the zoning controller an acknowledgement from the at least one zone TE controller confirming successful installation of one of the plurality of zones.

In accordance with an embodiment, a zoning controller for dynamic zoning of a network for traffic engineering (TE) in software defined networking (SDN) includes a processor and a computer readable storage medium storing programming for execution by the processor, the programming including instructions to: receive network zoning information from at least some of a plurality of SDN controllers in the network; partition the network into a plurality of zones, select a master controller and a plurality of local zone TE controllers from the plurality of SDN controllers, wherein each local zone TE controller corresponds to a respective one of the plurality of zones; transmit an installation command to at least one zone TE controller; and receive an acknowledgement from the at least one zone TE controller confirming successful installation of one of the plurality of zones. In an embodiment, zoning can be carried out recursively to create a desired zone hierarchy.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
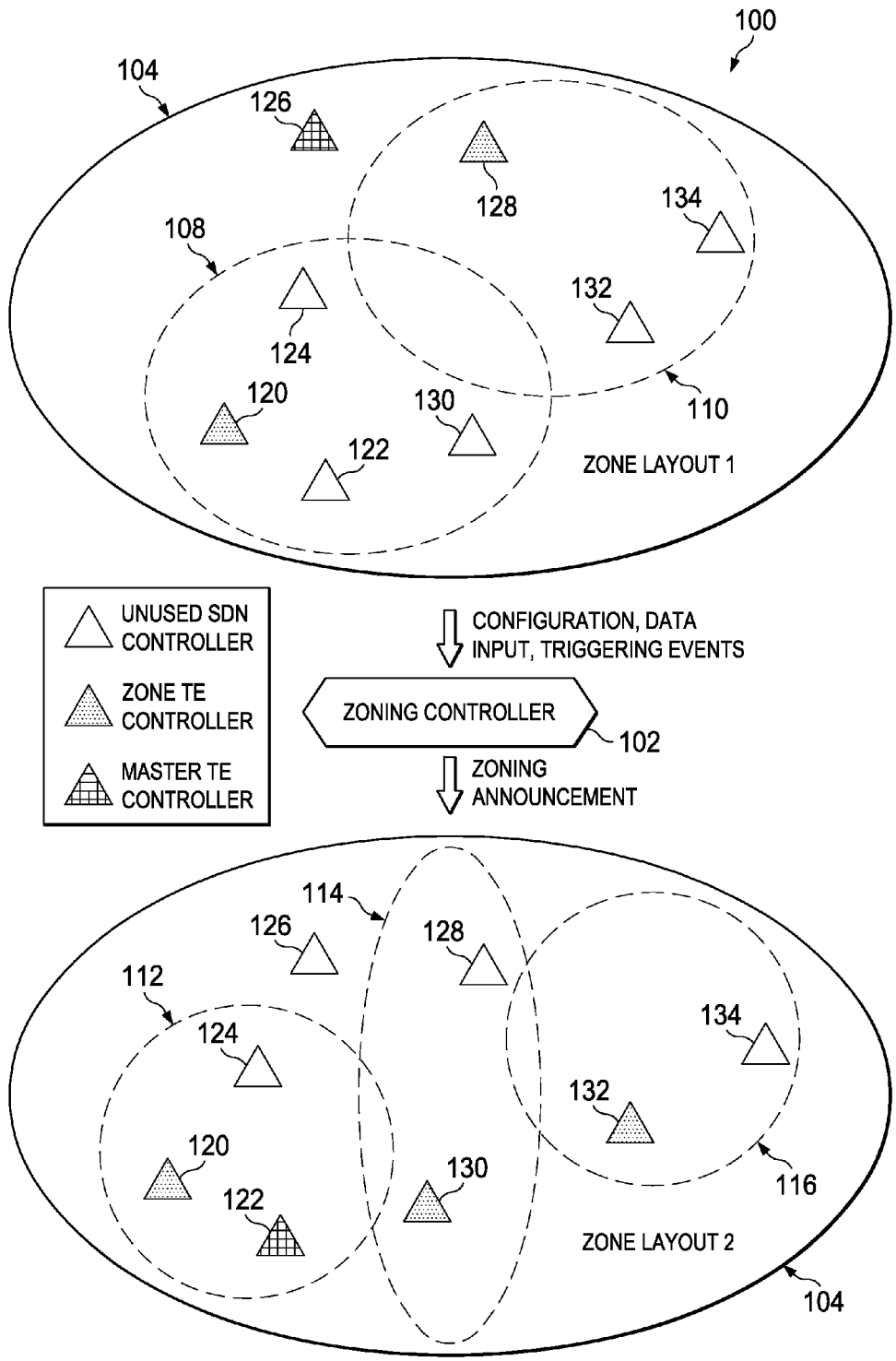
FIG. 1 illustrates a schematic diagram of a dynamic zoning distributed TE system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In software defined networks (SDNs), the traffic engineering (TE) task is normally performed by a central TE controller at the control plane. The controller collects node information, such as loading, resource availability, resource quality and so on, and link status, e.g. remaining capacity, buffer size, SE, etc. from the data plane; it runs an optimization logic to solve the TE problem and sends the provisioning results back to the data plane devices. Such fully centralized TE implies hardware complexity, communication overhead and provisioning delay.

However, in centrally controlled systems, the TE controller needs a powerful computing module to handle large-scale optimization. Otherwise, its processing capability limitations would cause large computational delays. Global information collection and provisioning occupy large bandwidth and incur large end-to-end network delays. Distributed TE can mitigate these problems. Distributed TE organizes the network into groups called zones, each with a local zone TE controller, also referred to as slave controller. Each slave controller collects local information, solves a local TE problem and performs local TE provisioning. A master controller coordinates slave controllers computation to ensure local TE provisioning lead to consistent (optimal) global TE provisioning. It may be co-located with a slave controller or present as a separate component.

The overhead of distributed TE depends on how network elements are grouped. Smaller network zones mean more localized overhead; but, 'smaller' means more overhead in master to slave controller communications, slave to master controller communications, and longer distributed TE control times. The performance of distributed TE also depends on traffic load. Computational delay and control cost increase in sudden traffic flash, as traffic load increase implies computational load increase at each slave controller. When computational load exceeds a slave controllers capability, intolerable delay may occur. Traffic load increase causes increased control cost in slave controller coordination, which in turn causes system throughput degradation.

Hence, zoning should be done carefully to find the balance between the network status overhead and distributed TE overhead and dynamically in accordance with traffic flow behavior change, so as to ensure optimal or satisfactory TE execution performance. Disclosed is a zoning controller component enabling dynamic zoning for distributed TE in SDN. As zoning is an optimization problem, disclosed are mathematical formulations with respect to different TE optimization models.

Disclosed herein are systems and methods for distributed TE in which the network is organized into zones, each with a local zone TE controller. Each zone TE controller solves a local (zone) TE problem and performs local TE provisioning. Thus, complexity is shared among multiple controllers such that the computation load is distributed throughout the network. Furthermore, network status information is transmitted locally and provisioning decisions are sent locally. Therefore, network status overhead is local only. In an embodiment, a master TE controller coordinates zone TE controllers computation to ensure local TE provisioning leads to a consistent and substantially optimal global TE provisioning.

FIG. 1 illustrates a schematic diagram of a dynamic zoning distributed TE system 100. The system 100 includes a zoning controller 102 that makes dynamic zoning decisions for a network 104. Network 104 includes a plurality of pre-configured potential SDN controllers 120, 122, 124, 126, 128, 130, 132, 134. Network 104 also includes a number of other network elements (not shown), such as, for example, routers, switches, servers, data stores, and user equipment (UEs). The potential SDN controllers 120, 122, 124, 126, 128, 130, 132, 134 and the other network elements are connected by various wired and wireless connections such that data and other signals can be transmitted to and from the various elements allowing the various elements to communicate with each other. Each of the potential SDN controllers 120, 122, 124, 126, 128, 130, 132, 134 has the capability of performing TE computation. The zoning controller 102 is configured to select local zone TE controllers and a master TE controller from the potential SDN controllers 120, 122, 124, 126, 128, 130, 132, 134. The zoning controller 102 also determines the members of each zone and selects a master TE controller from the potential SDN controllers 120, 122, 124, 126, 128, 130, 132, 134. Each local zone TE controller is responsible for making TE decisions for the network nodes and traffic flows within its respective zone. The local zone TE controllers communicate with the master TE controller which provides for TE between zones and instructs the local zone TE controllers on how to perform their TE decisions. The terms local zone TE controllers and slave controllers are equivalent to each other and may be used interchangeably throughout this disclosure. Additionally, the terms master TE controller and master controller are equivalent to each other and may also be used interchangeably throughout this disclosure.

Zone layout 1 shows the layout of the zones within the network 104 at one point in time and zone layout 2 shows the layout of the zones within the network 104 at a different point in time. Zone layout 1 includes two zones 108, 110 in which controller 120 has been selected by zoning controller 102 as the zone TE controller for zone 108 and controller 128 has been selected by the zoning controller 102 as the zone TE controller for zone 110. Controller 126 has been selected by zoning controller 102 to be the master TE controller in zone layout 1 104.

Zoning is triggered dynamically by TE execution performance deterioration and/or other events such as time out event. TE execution performance deterioration, i.e., increase in execution time and/or in control traffic, may be attributed to UE/traffic behavior change or network dynamics.

UE/Traffic behavior change may cause change in end-to-end connections or topology. When the number of end-to-end connections changes (e.g., due to flow arrival/departure), loading changes; when UEs move, routing path candidates change: more or less paths becoming available and path composition becoming different. Network dynamics may be the result of some external factors such as change in network topology, change in control plane topology (new controller candidate; new link cost, new controller or node capability, etc.) and change in data plane topology (link disappearance, new node, new link, etc.). The above changes and dynamics cause local TE problem statement change, resulting in TE execution performance deterioration.

TE execution performance deterioration can be detected centrally by the master controller (e.g., master TE controller 126 in zone layout 1 or master TE controller 122 in zone layout 2) (some threshold is passed). Each slave controller (e.g., local zone TE controllers 120, 130, and 132 in zone layout 2) may detect local performance deterioration in its zone too. The zoning controller 102 may be informed about TE execution performance deterioration by the master controller (e.g., master TE controller 126 in zone layout 1) or a slave controller (e.g., local zone TE controller 128 in zone layout 1), and upon notification, it may perform rezoning.

The zoning controller 102 takes as input control plane topology, data plane topology and traffic flow information. Control plane topology includes controller candidates, data plane devices (routers and base stations), and optionally UEs as nodes; direct logical links exist between controller candidates, between data plane devices and controller candidates, and between UEs and controller candidates. Nodes and links may be associated with parameters such as capability and connection cost. Data plane topology contains data plane devices as nodes and physical links as link, along with various parameters, e.g., capacity, loading, SE, etc., associated with them. Traffic flow information contains per flow routing path candidates and parameters, e.g. belonged virtual network, etc., associated with each flow. Some or all input data may be shared with one or more SDN controllers 120, 122, 124, 126, 128, 130, 132, 134, for example, through database, or obtained from one or more SDN controllers 120, 122, 124, 126, 128, 130, 132, 134 by message passing from network elements, UEs, or from the current master controller (e.g., master TE controller 126 in zone layout 1).

The zoning output includes master controller selection decision, which, in an embodiment, is optional if the master controller is fixed, and includes slave (zone) controller selection decision. The slave controller selection decision may be inferred from zone composition decision, too. That is, the controller candidates without any association are not selected. Zone composition decision include association between network elements and slave controllers. It is possible that some network elements are not associated with any slave controllers. Alternatively, it may contain associations between traffic flows and slave controllers (when flow grouping is specified in the zoning strategy in configuration). Here, a traffic flow is represented by its candidate routing paths. Zoning feasibility can be part of output. Zoning feasibility tells whether it is feasible under the constraints considered in the zoning algorithm. When it is not feasible, the result is sub optimal.

Figure 2:
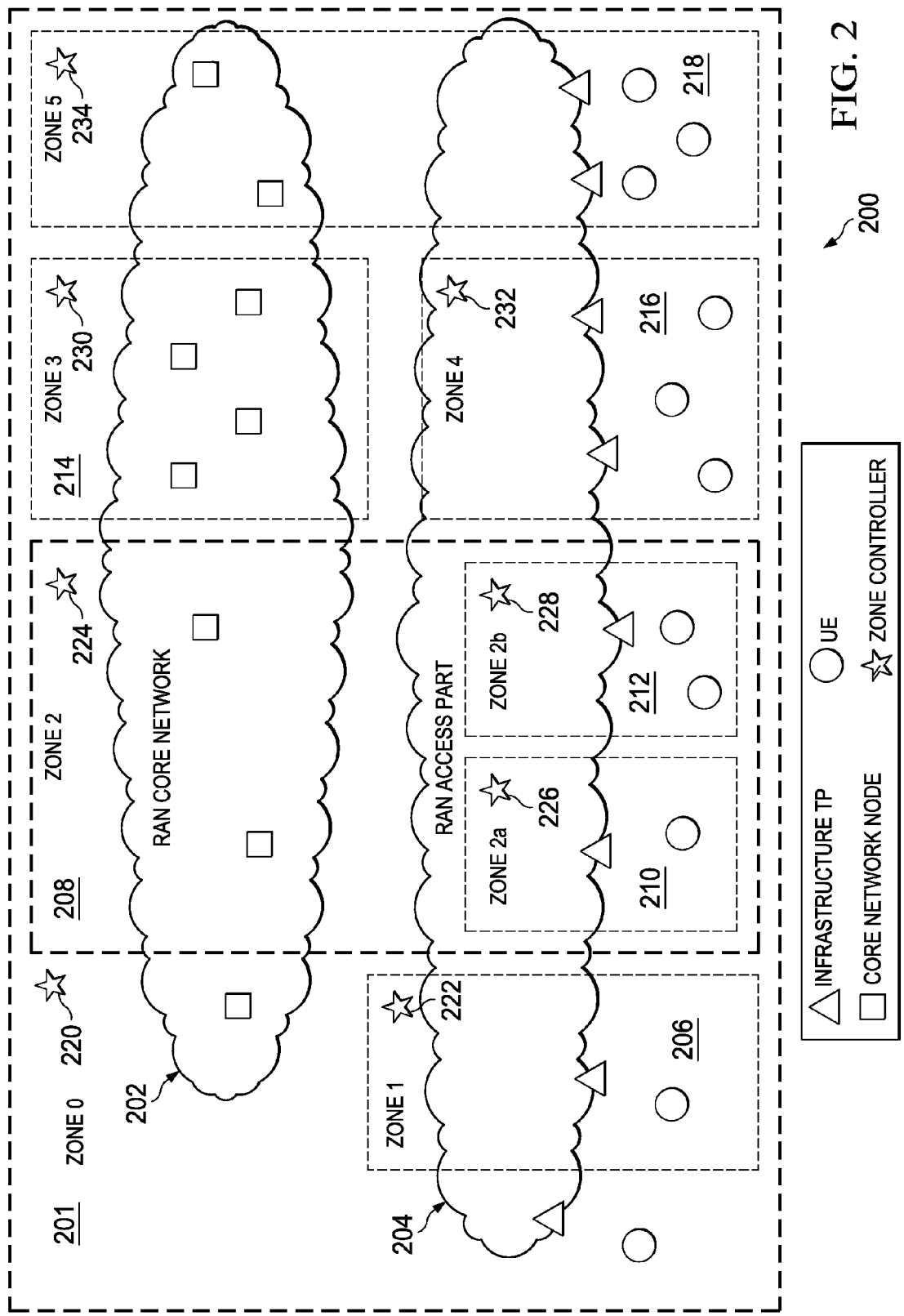
FIG. 2 illustrates an embodiment zoning controller.

FIG. 2 illustrates an embodiment zoning hierarchy 200. Zoning hierarchy includes a RAN core network 202 and a RAN access part network 204 that comprise a plurality of core network nodes, infrastructure TP, UEs, zone controllers, and other network devices (not shown). Zoning hierarchy 200 includes zone 0 201 that is subdivided into a plurality of sub-zones—e.g., zone 1 206, zone 2 208, zone 3 214, zone 4 216, and zone 5, 234—thus creating a hierarchy of zones. Zone 0 is the parent zone to the sub-zones 1 206, zone 2 208, zone 3 214, zone 4 216, and zone 5, 234. Zone controller 220 is the local zone TE controller for zone 0 201 and is the master zone controller for the sub-zones—zone 1 206, zone 2 208, zone 3 214, zone 4 216, and zone 5 218. Zone 2 208 includes a plurality of further sub-zones—zone 2a 210 and zone 2b 212. Thus, zone 2 208 is the parent zone to sub-zones 210 and 212. The local zone TE controller 224 for zone 2 208 is the master TE controller for zone 2a 210 and zone 2b 212. Each of zone 1 206, zone 3 214, zone 4 216, and zone 5 218 also include a respective local zone TE controller 222, 230, 232, 234. A zoning controller, such as, for example, zoning controller 102 in FIG. 1, is configured to create the hierarchy of zones illustrated in FIG. 2. Furthermore, in an embodiment, the zoning controller is configured to use different zoning schemes for different levels of sub-zones or for sub-zones in different parent zones, thereby resulting in a hybrid hierarchical zoning system. The zoning controller may dynamically create different zones from a network in response to a triggering condition as discussed above and below. The zoning controller may implement a non-hierarchical zoning system at one point in time and then switch to a hierarchical system or hybrid hierarchical system at later point in time based on changes in network zoning information such as, for example, control plane topology, data plane topology, traffic flow information, etc. The zoning controller may also dynamically switch from a hierarchical zoning system to a non-hierarchical zoning system.

Figure 3:
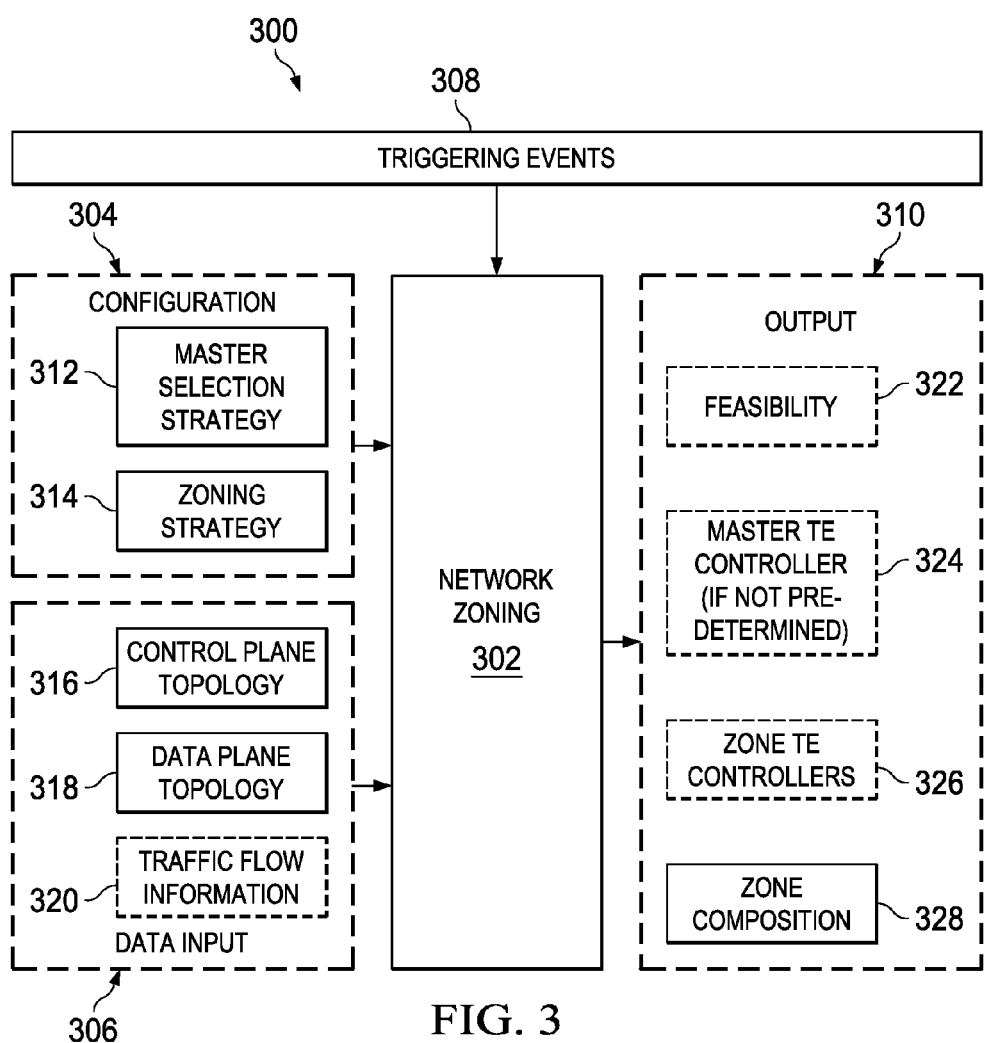
FIG. 3 illustrates an embodiment method for signaling a zoning announcement.

FIG. 3 illustrates an embodiment zoning controller 300. Zoning controller 300 may be implemented as zoning controller 102 in FIG. 1. Zoning controller 300 includes a network zoning processor 302, a configuration interface 304, a data input interface 306, a triggering events interface 308, and an output interface 310. The configuration interface receives configuration information that includes selection strategy 312 and zoning strategy 314. The configuration interface may also receive zoning algorithm information allowing the zoning algorithm to be dynamically configurable and change based on differing administrator preferences or network conditions or topology. The data input interface 306 receives control plane topology information 316, data plane topology information 318, and traffic flow information 320. The network zoning processor 302 uses the configuration information (e.g., selection strategy 312 and zoning strategy 314) and network information (e.g., control plane topology information 316, data plane topology information 318, and traffic flow information 320) from the data input interface 306 to determine zoning output information such as, for example, zones, identities of local zone TE controllers and a master TE controller from a plurality of SDN controllers in the network. The network zoning processor 302 provides its zoning output information to the output interface 310 which transmits the zoning output information to one or more SDN controllers in the network. The output information transmitted by the output interface 310 includes a zone feasibility result 322, a master TE controller identification 324, local zone TE controller identities 326, and zone composition information 328. As discussed above, zoning feasibility result 322 tells whether the zoning is feasible under the constraints considered in the zoning algorithm. Zone composition information 328 indicates which nodes or network components (e.g., servers, routers, wireless access points, user equipment, etc.) are in each zone.

In an embodiment, the zoning controller 300 sits in the control plane. Physically, the zoning controller 300 may be co-located with one of the pre-configured SDN controllers (e.g., SDN controllers 120, 122, 124, 126, 128, 130, 132, 134 in FIG. 1) in the network (e.g., network 104 in FIG. 1). The zoning controller 300 selects from a given set of SDN controllers, referred to as zone controller candidates or simply controller candidates, as master and slave controllers and create zones based on them. It makes zoning decisions according to certain configuration, upon some triggering events. Examples of triggering events include changes in traffic behavior in the network, change in topology, change in node capability, change in node and link network state, change in buffer status, change in delay statistics, and change in available bandwidth. The configuration information is received from an SDN controller. It specifies a master selection strategy and a zoning strategy The master selection strategy provides the network zoning processor with a methodology for how to select the master controller from the controller candidates. Possible strategies include random selection, fixed selection, joint optimization with zoning, etc. Selection preference/unpreference and other necessary data may be specified along with the selection strategy. The zoning strategy 314 indicates whether to perform node grouping or flow grouping. The former means to create zones by associating nodes (routers, switches, base stations, UEs, etc) to controllers; the latter implies to do so by associating flows (represented by their candidate routing paths) to controllers. In an embodiment, which strategy to use depends on network and traffic status. For instance, in stable flow network segments flow grouping is preferable over node grouping; whereas, in unstable flow segments the opposite is desired.

Other parameters, for example, zone border type, can be included in zoning configuration 314. There are three border types: link sharing only, node sharing only, and link and node sharing.

As described above, zoning can be performed recursively to create a desired zone hierarchy. In each recursion, zoning may be done according to a different configuration, e.g. different master selection strategy and/or different zoning strategy (node grouping or flow grouping), leading to a hybrid zoning result in the end. The zoning controller 300 installs zones by sending an installation command to slave controllers and expects an ACK from them. The command tells a slave controller which network elements belong to its zone. On receiving an installation command, a slave controller invites the nodes specified in the command to join its zone. The invitation message tells the nodes which of their incidental links are invited together. Each zone member (node) sends an ACK to the slave controller as response to the invitation.

After receiving all invitation ACKs, a slave controller sends an ACK to the zoning controller 300 as response to the installation command. After receiving all installation ACKs, the zoning controller informs the master controller about the slave controllers and the border of each zone (or simply the whole zoning decision) as well as the zoning strategy used. The zoning controller 300 may alternatively do so in parallel with zone installation.

Optionally, the zoning controller 300 may explicitly signal controller candidates about their status like whether selected as master controller and/or whether used as slave controller. If the zoning controller 300 does not receiver confirmations from a slave controller, that slave controller is removed from the candidate list and zoning is done again.

Figure 4:
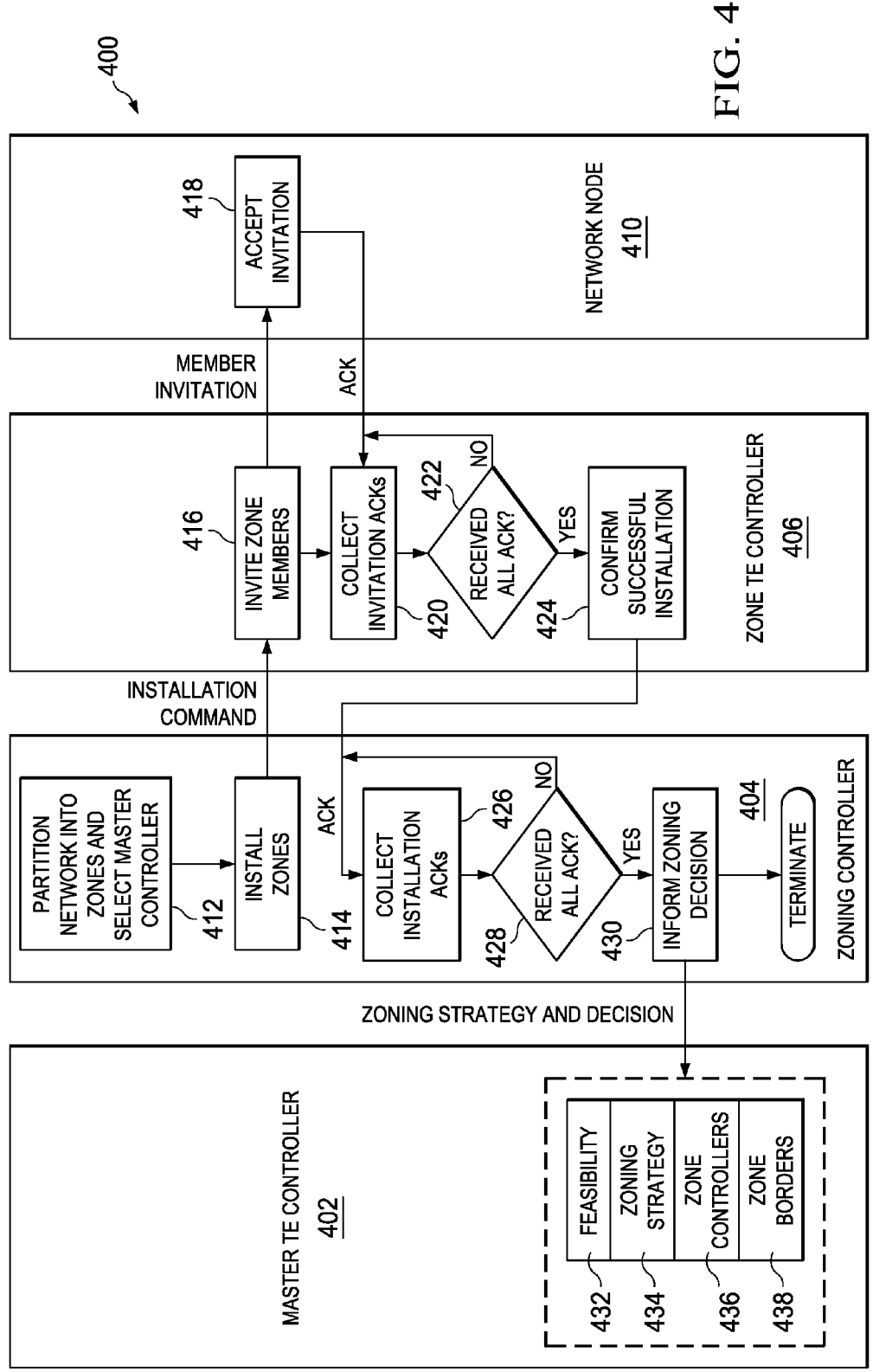
FIG. 4 illustrates an embodiment method for determining zoning for distributed TE in SDN.

FIG. 4 illustrates an embodiment method 400 for signaling a zoning announcement. Method 400 may be implemented in dynamic zoning distributed TE system 100 depicted in FIG. 1. Method 400 begins at block 412 where the zoning controller 404 partitions the network into zones and elects a master TE controller. At block 414, the zoning controller 404 installs zones and transmits an installation command to the zone TE controller 406. At block 416, the zone TE controller transmits a member invitation to a network node 410 to invite zone members. At block 418, the network node accepts the invitation and transmits an acknowledgement back to the zone TE controller 406. At block 420, the zone TE controller 406 collects the invitation acknowledgements from the network nodes in its zone and, at block 422 determines whether it has received all of the acknowledgements. If no, the method 400 proceeds back to block 420 where the zone TE controller 406 continues to collect the invitation acknowledgments from network nodes. Once all the acknowledgements have been received, the method 400 proceeds from block 422 to block 424 where the zone TE controller 406 confirms successful installation of the zone and transmits an acknowledgement back to the zoning controller 404 indicating such.

At block 426, the zoning controller 404 collects the installation acknowledgements from the plurality of zone TE controllers to which the zone installation command was transmitted and determines, at block 428, whether all of the acknowledgements have been received. If all of the acknowledgements have not been received, then the method 400 proceeds back to block 426 to continue collecting the installation acknowledgments. Once all of the acknowledgments have been received, then the method 400 proceeds to block 430 where the zoning controller 404 transmits a zoning strategy and zoning decision to the master TE controller 402, after which, the method 400 terminates in the zoning controller.

The master TE controller 402 receives the zoning strategy and the zoning decision from the zoning controller 404. The zoning strategy and zoning decision includes a feasibility report 432, zoning strategy 434, the identity of zone TE controllers 436, and an identification of the zone borders 438.

In an embodiment, the master controller is pre-defined. That is, given a set of controller candidates, one of the set is appointed master controller. The zoning objective is to select slave controllers from the candidates and associate nodes and links to them such that, when a distributed TE algorithm is run over the resultant zones, its cost is minimized.

The cost of distributed TE execution comes from slave controller initialization overhead, intra-zone information collection overhead and master-slave coordination overhead. The last type of overhead is due to the master controller's collecting transient results and updating some kind of cost on zone border elements (nodes and links). Two zoning strategies, node grouping and flow grouping, respectively corresponding to the two well-known TE problem formulation models, i.e., arc model and path model, are described herein. The following denotations are used throughout this disclosure.

N: the set of nodes in the network
S: the set of controller candidates, $S \subseteq N$
F: the set of traffic flows
m: the master controller, $m \in S$
$\alpha$: the number of data units per node report
$\beta$: the number of data units per link report
$\gamma$: the number of data units per shared element between zones (border element)
$\mu$: the number of data units per flow description
$\eta$: the number of distributed TE optimization iterations
$q_s$: the processing load limit of controller candidate $s \in S$
$l_{ij}$: the connectivity indicator of i and j, $\forall i,j \in N$
$h_{ij}$: the control cost per data unit from i to j, $\forall_i, j \in S \cup N$
$n_{fg}$: number of network elements shared in f, g, $\forall f, g \in F$ (path TE only)
$\delta_i^f$: containment indicator of i in f, $\forall_i \in N$, $\forall f \in F$ (path TE only)
$\delta_{ij}^f$: containment indicator of link (i,j) in f, $\forall i,j \in N$: $l_{ij}=1$, $\forall f \in F$ (path TE only)

Zoning by Node Grouping

In an embodiment, when the arc model is employed in TE problem formulation, a rate allocation decision has to be made for every flow over every link in the network. In this case, each slave controller is initialized with complete flow information, and zoning is carried out by applying the node grouping strategy, i.e., associating nodes (routers, switches, base stations, UEs, etc.) to slave controllers, subject to slave controller selection.

In an embodiment, each node (router, switch, base station, UE, etc.) is associated with one and only one slave controller; once a node is associated with a slave controller, its incidental links become associated with the same controller automatically. When the network and the flow set are given, the processing load of a controller candidate s is a function of the association vector $A_s$ and the selection indicator $c_s$, referred to as $g_s(A_s; c_s)$, where $A_s = \{a_{is}|a_{is}=1 \text{ if i is associated to s, and 0 otherwise; } i \in N\}$.

The function $g_s(A_s; c_s)$ returns a positive value if $c_s=1$, and zero otherwise. In an embodiment, in each optimization iteration, the master controller collects transient results from all slave controllers before starting next iteration. In an embodiment, to minimize waiting time, the processing load among slave controllers is balanced. In an embodiment, the zoning problem is formulated as an optimization problem below.

Problem 1

$$\min \sum_{s \in S} (d_s^{init} + d_s^{coll} + d_s^{coor}) \quad (1)$$

s.t.

$$d_s^{init} = c_s h_{ms} \mu |F|, \forall s \in S$$

$$d_s^{coll} = c_s \sum_{i \in N} a_{is} h_{is} \left( \alpha + \beta \sum_{j \in N: j \neq i} l_{ij} \right), \forall s \in S \quad (2)$$

$$d_s^{coor} = 2 c_s \eta \gamma (h_{ms} + h_{sm}) \sum_{i,j \in N} l_{ij}(a_{is} + a_{js} - 2 s_{is} a_{js}), \forall s \in S \quad (3)$$

$$g_s(A_s, c_s) \leq q_s, \forall s \in S \quad (4)$$

$$a_{is} \in \{0, 1\}, \forall i \in N, \forall s \in S \quad (5)$$

$$c_s \in \{0, 1\}, \forall s \in S \quad (6)$$

$$\sum_{s \in S} a_{is} = 1, \forall i \in N \quad (7)$$

$$c_s + \sum_{s' \in S: s' \neq s} a_{ss'} = 1, \forall s \in S \quad (8)$$

where $a_{is}$, $c_s$ are decision variables, respectively indicating whether i is associated with s and whether s is selected as a slave controller.

Condition (1) gives per zone initialization cost; condition (2) indicates per zone information collection cost; per zone master-slave coordination cost is provided by condition (3). Condition (4) is per slave controller processing load constraint. Conditions (5) and (6) respectively constrain the decisions on node controller association and slave controller selection to be binary. Constraint (7) indicates that each node is associated to exactly one controller. Constraint (8) says a selected controller is self-associated. The problem may not be feasible due to Constraint (4).

Simplification

Examine Conditions (2) and (3). Variables $c_s$ are redundant in the multiplication operations with $a_{is}$. It is because, given $s \in S$, when $c_s=0$, $a_{is}=0$; $\forall i \in N$. Hence, these redundant variables can be safely removed from these operations. Notice $c_s = \max_{i \in N} a_{is}$ due to the binarity of variables $a_{is}$ and that the objective function is to be minimized. These two facts allow to reduce $g_s(A_s, c_s)$ to $g_s(A_s)$ and replace the binary constraint (6) with the following non-binary one:

$a_{is} \leq c_s, \forall s \in S$.

The term $(a_{is}+a_{js}-2a_{is}a_{js})$ in constraint (3) reflects whether one and only one of nodes i and j is associated with slave controller s. Because $a_{is}$ and $a_{js}$ are binary variables, it can be derived that $a_{is}+a_{js}-2a_{is}a_{js}=(a_{is}-a_{js})^2=|a_{is}-a_{js}|$ and consequently $$d_s^{coor} = 2\eta\gamma(h_{ms} + h_{sm}) \sum_{i,j \in N} l_{ij}|a_{is} - a_{js}|.$$

Add auxiliary variables $b_{ij}^s$ and the following two constraints to the problem $a_{is} - a_{js} \leq b_{ij}^s, \forall i,j \in N, \forall s \in S$ $a_{js} - a_{is} \leq b_{ij}^s, \forall i,j \in N, \forall s \in S$ and further replace $|a_{is}-a_{js}|$ with $b_{ij}^s$ in the new expression of $d_s^{coor}$. Because the objective function is to be minimized, $b_{ij}^s$ will be enforced to equal $|a_{is}-a_{js}|$ and represent whether i and j are associated with different slave controllers.

After the above simplification manipulations, the following linear problem (i.e., Problem 2) is obtained, which is equivalent to Problem 1, but with less binary constraints.

Problem 2

$$\min \sum_{s \in S} (d_s^{init} + d_s^{coll} + d_s^{coor})$$

s.t.

$$d_s^{init} = c_s h_{ms} \mu |F|, \forall s \in S$$

$$d_s^{coll} = \sum_{i \in N} a_{is} h_{is} \left( \alpha + \beta \sum_{j \in N: j \neq i} l_{ij} \right), \forall s \in S$$

$$d_s^{coor} = 2\eta\gamma(h_{ms} + h_{sm}) \sum_{i,j \in N} l_{ij} b_{ij}^s, \forall s \in S$$

$$g_s(A_s) \leq q_s, \forall s \in S$$

$$a_{is} \in \{0, 1\}, \forall i \in N, \forall s \in S$$

$$a_{is} - a_{js} \leq b_{ij}^s, \forall i, j \in N, \forall s \in S$$

$$a_{js} - a_{is} \leq b_{ij}^s, \forall i, j \in N, \forall s \in S$$

$$a_{is} \leq c_s, \forall i \in N, \forall s \in S$$

$$\sum_{s \in S} a_{is} = 1, \forall i \in N$$

$$c_s + \sum_{s' \in S: s' \neq s} a_{ss'} = 1, \forall s \in S$$

where $a_{is}$, $b_{ij}^s$, $c_s$ are decision variables.

Zoning by Flow Grouping

Path model based TE requires routing path candidates to be pre-determined for every traffic flow. This allows the network to be partitioned by associating flows to slave controllers so as to limit slave controller initialization cost only to the cost of distributing information of the flows belonging to their own zones. In the sequel, when no ambiguity, term 'flow' is used to represent the collection of its routing path candidates. Each flow is associated with one and only one slave controller; once a flow is associated with a slave controller, its comprising network elements (nodes and links) become associated with that slave controller automatically. Obviously, zones may share both links and nodes. The processing load of a controller candidate s is a function of the association vector $A_s$ and the selection indicator $c_s$, referred to as $g_s(A_s; c_s)$, where $A_s = \{a_{fs} | a_{fs} = 1$ if f is associated to s, and 0 otherwise; $f \in F\}$.

The function $g_s(A_s, c_s)$ returns a positive value if $c_s = 1$, and zero otherwise, Below is an optimization problem (i.e., Problem 3) formulated for this scenario.

Problem 3

$$\min \sum_{s \in S} (d_s^{init} + d_s^{coll} + d_s^{coor}) \quad (9)$$

s.t.

$$d_s^{init} = c_s \mu \sum_{j \in F} a_{fs}, \forall s \in S$$

$$d_s^{coll} = c_s \left( \alpha \sum_{i \in N} u_i^s h_{is} + \beta \sum_{i,j \in N: l_{ij}=1} v_{ij}^s h_{is} \right), \forall s \in S \quad (10)$$

$$d_s^{coor} = 2 c_s \eta \gamma (h_{sm} + h_{ms}) \sum_{f \in F} \sum_{g \in F: g \neq f} n_{fg} (a_{fs} + a_{gs} - 2 a_{fs} a_{gs}), \quad (11)$$

$\forall s \in S$ $$g_s(A_s, c_s) \leq q_s, \forall s \in S \quad (12)$$

$$u_i^s = \max_{f \in F} \delta_i^f a_{fs}, \forall \in N, \forall s \in S \quad (13)$$

$$v_{ij}^s = \max_{f \in F} \delta_{ij}^f a_{fs}, \forall i, j \in N: l_{ij}=1, \forall s \in S \quad (14)$$

$$a_{fs} \in \{0, 1\}, \forall f \in F, \forall s \in S \quad (15)$$

$$c_s \in \{0, 1\}, \forall s \in S \quad (16)$$

$$\sum_{s \in S} a_{fs} = 1, \forall f \in F \quad (17)$$

where $a_{fs}$, $c_s$ are decision variables and constraints (13) and (14) indicate whether a network element (node or link) is associated with a slave controller.

Using the simplification techniques described before, the binary constraint on variables $c_s$ can be removed, and this problem can be converted to the following problem (i.e., Problem 4):

Problem 4

$$\min \sum_{s \in S} (d_s^{init} + d_s^{coll} + d_s^{coor})$$

s.t.

$$d_s^{init} = \mu \sum_{f \in F} a_{fs}, \forall s \in S$$

$$d_s^{coll} = \alpha \sum_{i \in N} u_i^s h_{is} + \beta \sum_{i,j \in N: l_{ij}=1} v_{ij}^s h_{is}, \forall s \in S$$

$$d_s^{coor} = 2 \eta \gamma (h_{sm} + h_{ms}) \sum_{f \in F} \sum_{g \in F: g \neq f} n_{fg} b_{fg}^s, \forall s \in S$$

$$g_s(A_s) \leq q_s, \forall s \in S$$

$$\delta_i^f a_{fs} \leq u_i^s, \forall f \in F, \forall i \in N, \forall s \in S$$

$$a_{fs} \leq v_{ij}^s, \forall f \in F, \forall i, j \in N: l_{ij}=1, \forall s \in S$$

$$a_{fs} \in \{0, 1\}, \forall f \in F, \forall s \in S$$

$$a_{fs} - a_{gs} \leq b_{fg}^s, \forall f, g \in F, \forall s \in S$$

$$a_{gs} - a_{fs} \leq b_{fg}^s, \forall f, g \in F, \forall s \in S$$

$$\sum_{s \in S} a_{fs} = 1, \forall f \in F$$

where $a_{fs}$, $b_{fg}^s$, $u_i^s$, $v_{ij}^s$ are decision variables.

Controller Processing Load

Problems 2 and 4 both have a per controller processing load constraint. The constraint involves per controller processing load limit and per controller load function. Processing load can be measured in different ways. One way is to use the maximum number of decision variables that a controller can handle in its zone TE optimization, as processing load is generally an increasing function of it. In Problem 2 (node grouping), it is the number of links associated to a controller times the number of flows:

$$g_s(A_s) = |F| \sum_{i \in N} \left( a_{is} \sum_{j \in N: j \neq i} l_{ij} \right);$$

in Problem 4 (flow grouping), it is the size sum of flows associated to a controller:

$$g_s(A_s) = \sum_{f \in F} a_{fs} |f|,$$

where the size |f| of flow f is defined as the number of candidate routing paths of f and known a priori.

Per controller processing load limit $q_s$ is subject to controller processing capability as well as the system's operational requirement. It can be estimated statistically using historical data. Once $g_s(A_s)$ and $q_s$ are specified, the zoning controller is able to solve Problem 2 (node grouping) or 4 (flow grouping) to obtain a zoning decision.

Figure 5:
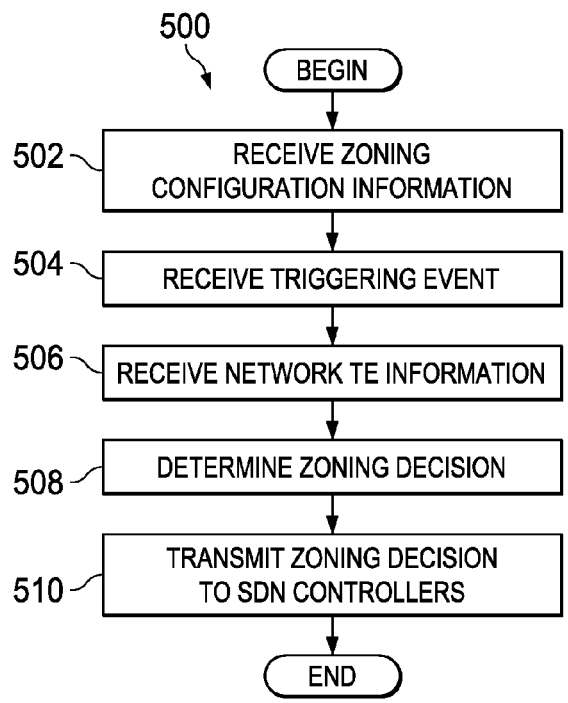
FIG. 5 illustrates an embodiment method for determining zoning for distributed TE in SDN.

FIG. 5 illustrates an embodiment method 500 for determining zoning for distributed TE in SDN. Method 500 may be implemented by zoning controller 300 in FIG. 3. The method 500 begins at block 502 where the zoning controller receives zoning configuration information. The zoning configuration information may include selection strategy, zoning strategy, and zoning algorithm. The zoning algorithm may be a configurable zoning algorithm allowing the algorithm to be changed based on changes to administrator preferences or to network conditions such as traffic flow and network topology. Zoning strategy may include preference of, for example, node grouping based zoning scheme or flow grouping based zoning scheme. A node grouping based zoning scheme is a type of geographical based zoning scheme. In an embodiment, the zoning configuration information is dynamically changeable in response to changing conditions or changes in network administrator preferences. At block 504, the zoning controller receives a triggering event. The triggering event causes the zoning controller to make a zoning decision. Examples of triggering events include an indication of TE execution performance deterioration and/or other events such as time out event. TE execution performance deterioration, i.e., increase in execution time and/or in control traffic, may be attributed to UE/traffic behavior change or network dynamics. At block 506, the zoning controller receives network TE information and, at block 508, uses the network TE information and the zoning configuration information to determine a zoning decision in response to the triggering event. Examples of network TE information include control plane topology, data plane topology, and traffic flow information. The zoning decision may include a zoning feasibility decision, an identification of a master TE controller from a plurality of SDN controllers in the network, an identification of a plurality of local zone TE controllers from the plurality of SDN controllers in the network, and the composition of each zone. The composition of each zone may include the identities of the network elements that are included in each zone. At block 510, the zoning decision is transmitted to one or more SDN controllers, after which, the method 500 ends. In an embodiment, only partial zoning decision information (also referred to as partial decision information) may be transmitted to some SDN controllers. Partial zoning decision information may include a partial list of members of each zone. The partial list may only include, for example, identity of nodes that are border nodes (e.g., nodes that have connections to nodes in a different zone or that are members of two zones). For example, in an embodiment, only the zone composition for the zone to which an SDN controller has been assigned as the local zone TE controller may be transmitted to that SDN controller.

Figure 6:
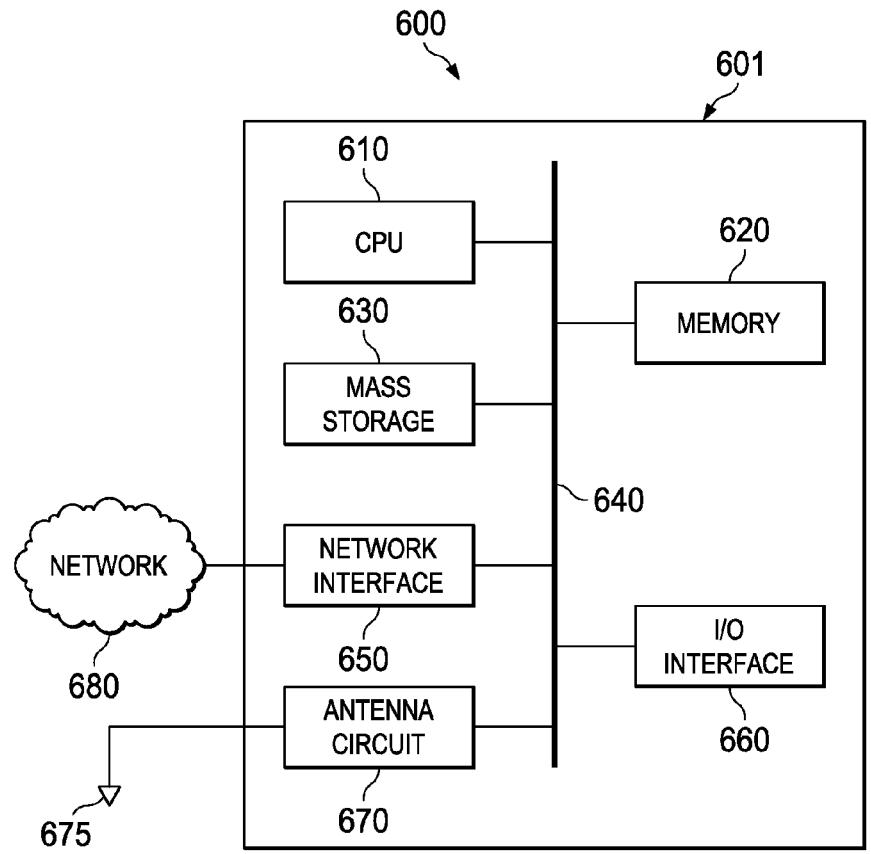
FIG. 6 illustrates a computing platform that may be used for implementing, for example, the devices and methods described herein, in accordance with an embodiment.

FIG. 6 is a block diagram of a processing system 600 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 600 may comprise a processing unit 601 equipped with one or more input/output devices, such as a speaker, microphone, mouse, touchscreen, keypad, keyboard, printer, display, and the like. The processing unit 601 may include a central processing unit (CPU) 610, memory 620, a mass storage device 630, a network interface 650, an I/O interface 660, and an antenna circuit 670 connected to a bus 640. The processing unit 601 also includes an antenna element 675 connected to the antenna circuit.

The bus 640 may be one or more of any type of several bus architectures including a memory bus or memory controller, a peripheral bus, video bus, or the like. The CPU 610 may comprise any type of electronic data processor. The memory 620 may comprise any type of system memory such as static random access memory (SRAM), dynamic random access memory (DRAM), synchronous DRAM (SDRAM), read-only memory (ROM), a combination thereof, or the like. In an embodiment, the memory 620 may include ROM for use at boot-up, and DRAM for program and data storage for use while executing programs.

The mass storage device 630 may comprise any type of storage device configured to store data, programs, and other information and to make the data, programs, and other information accessible via the bus 640. The mass storage device 630 may comprise, for example, one or more of a solid state drive, hard disk drive, a magnetic disk drive, an optical disk drive, or the like.

The I/O interface 660 may provide interfaces to couple external input and output devices to the processing unit 601. The I/O interface 660 may include a video adapter. Examples of input and output devices may include a display coupled to the video adapter and a mouse/keyboard/printer coupled to the I/O interface. Other devices may be coupled to the processing unit 601 and additional or fewer interface cards may be utilized. For example, a serial interface such as Universal Serial Bus (USB) (not shown) may be used to provide an interface for a printer.

The antenna circuit 670 and antenna element 675 may allow the processing unit 601 to communicate with remote units via a network. In an embodiment, the antenna circuit 670 and antenna element 675 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 670 and antenna element 675 may also provide Bluetooth and/or WiFi connection to other devices.

The processing unit 601 may also include one or more network interfaces 650, which may comprise wired links, such as an Ethernet cable or the like, and/or wireless links to access nodes or different networks. The network interface 601 allows the processing unit 601 to communicate with remote units via the networks 680. For example, the network interface 650 may provide wireless communication via one or more transmitters/transmit antennas and one or more receivers/receive antennas. In an embodiment, the processing unit 601 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a network component for dynamic zoning for traffic engineering (TE) in software defined networking (SDN), the method comprising:

receiving, at the network component, network information from at least one SDN controller from a plurality of SDN controllers in a network, the network information includes traffic flow information for nodes in the network;

determining, with the network component, in response to detection of a trigger comprising at least one of a change in traffic behavior in the network, a change in topology, a change in node capability, a change in a node state, a change in a buffer status, a change in delay statistics, and a change in available bandwidth, according to the network information and a zoning scheme, a plurality of TE zones for the network;

selecting, with the network component, a local zone TE controller for each of the plurality of TE zones;

performing, with the network component, at least one of determining zone membership of each of the TE zones and selecting a master TE controller, wherein the local zone TE controller is selected from one of the SDN controllers, and wherein the master TE controller is selected from one of the SDN controllers; and transmitting, with the network component, an indication of at least one of the local zone TE controllers, and at least one of at least a partial list of the zone membership of at least one of the TE zones and the master controller to at least one of the SDN controllers.

2. The method of claim 1, wherein the zoning scheme comprise a configurable algorithm.

3. The method of claim 1, further comprising rezoning the network in response to a triggering event from one or more SDN controllers.

4. The method of claim 3, wherein the triggering event comprises at least one of changes in traffic behavior in the network, change in topology, change in node capability, change in node and link network state, change in buffer status, change in delay statistics, and change in available bandwidth.

5. The method of claim 1, further comprising:
receiving an indication of TE execution performance deterioration; and
rezoning the network.

6. The method of claim 5, wherein the indication of TE execution performance deterioration is received from one of the master controller and one of the plurality of local zone TE controllers.

7. The method of claim 5, wherein rezoning the network comprises determining a new plurality of TE zones for the network, a new local zone TE controller for each of the plurality of TE zones, and a new master TE controller.

8. The method of claim 1, wherein the zoning scheme comprises a flow based zoning scheme when traffic flow behavior is relatively stable.

9. The method of claim 8, wherein network elements comprising candidate routing paths of a flow belong to a same zone and the network information comprises traffic flow information.

10. The method of claim 1, wherein the zoning scheme comprises a node grouping based zoning scheme or a flow grouping based zoning scheme.

11. The method of claim 1, wherein the network information comprises at least one of traffic flow information, network topology, node capability, node and link network state (buffer status, delay statistics, available bandwidth).

12. The method of claim 1, further comprising transmitting at least one of zoning strategy and at least partial decision information to the master TE controller.

13. The method of claim 1, wherein the master TE controller is also one of the local zone TE controllers.

14. The method of claim 1, wherein transmitting with the network component an indication of at least one of the local zone TE controllers, and at least one of at least a partial list of the zone membership of at least one of the TE zones and the master controller to at least one of the SDN controllers comprises transmitting a list of the zone membership of a first TE zone to a corresponding first local zone TE controller, wherein the first zone comprises one of the TE zones, wherein the first local zone TE controller uses the list of the zone membership of the first TE zone to invite the members of the first TE zone to join the first TE zone.

15. The method of claim 14, further comprising:
receiving an acknowledgement of successful installation of the first TE zone from the corresponding first local zone TE controller.

16. The method of claim 15, further comprising:
transmitting at least a partial zoning decision to the master TE controller after receiving an acknowledgment of successful installation of each of the plurality of TE zones.

17. The method of claim 16, wherein the partial zoning decision comprises an identification of each local zone TE controller, a respective zone corresponding to each local zone TE controller, and an identification of at least some of the members of each TE zone.

18. The method of claim 17, wherein the identification of at least some of the members of each TE zone comprises an identification of border nodes of each of the TE zones and of links shared between at least two TE zones.

19. The method of claim 1, wherein at least one of the TE zones comprise a plurality of TE sub-zones, wherein a local zone TE controller for the at least one of the TE zones comprises a master controller to the plurality of TE sub-zones.

20. The method of claim 19, wherein a zoning scheme used to determine the plurality of TE sub-zones is different from the zoning scheme used to determine the TE zones.

21. A network component for dynamic zoning for traffic engineering (TE) in software defined networking (SDN), the network component comprising:
a processor; and
a computer readable storage medium storing programming for execution by the processor, the programming including instructions to:
receive network information from at least one SDN controller from a plurality of SDN controllers in a network, the network information includes traffic flow information for nodes in the network;
determine, in response to detection of a trigger comprising at least one of a change in traffic behavior in the network, a change in topology, a change in node capability, a change in a node state, a change in a buffer status, a change in delay statistics, and a change in available bandwidth, according to the network information and a zoning scheme, a plurality of TE zones for the network;
select a local zone TE controller for each of the plurality of TE zones according to the network information and the zoning scheme, wherein the local zone TE controller is selected form one of the SDN controllers;
determine at least one of zone membership of each of the TE zones and a master TE controller according to the network information and the zoning scheme, wherein the master TE controller is selected from one of the SDN controllers; and
transmit an indication of the local zone TE controllers, and at least one of at least a partial list of the zone membership of at least one of the TE zones and the master controller to at least one of the SDN controllers.

22. The network component of claim 21, wherein the zoning scheme comprise a configurable algorithm.

23. The network component of claim 21, wherein the programming further comprises instructions to rezone the network in response to a triggering event from one or more SDN controllers.

24. The network component of claim 23, wherein the triggering event comprises at least one of changes in traffic behavior in the network, change in topology, change in node capability, change in node and link network state, change in buffer status, change in delay statistics, and change in available bandwidth.

25. The network component of claim 21, wherein the programming further comprises instructions to:
receive an indication of TE execution performance deterioration; and
rezone the network.

26. The network component of claim 25, wherein the indication of TE execution performance deterioration is received from one of the master TE controller and one of the plurality of local zone TE controllers.

27. The network component of claim 25, wherein rezoning the network comprises determining a new plurality of TE zones for the network, a new local zone TE controller for each of the plurality of TE zones, and a new master TE controller.

28. The network component of claim 21, wherein the zoning scheme comprises a traffic flow grouping based zoning scheme.

29. The network component of claim 28, wherein network elements comprising candidate routing paths of a flow belong to a same zone and the network information comprises traffic flow information, topology, node capability, node and link network state (buffer status, delay statistics, available bandwidth).

30. The network component of claim 21, wherein the zoning scheme comprises a node grouping based zoning scheme when traffic flow behavior is not stable.

31. The network component of claim 21, wherein the network information comprises at least one of network topology and node capability.

32. The network component of claim 21, wherein the programming further comprises instructions to transmit at least one of zoning strategy and at least partial zoning membership information to the master TE controller.

33. The network component of claim 21, wherein the master TE controller is also one of the local zone TE controllers.

34. The network component of claim 21, wherein the instructions to transmit with the network component an indication of at least one of the local zone TE controllers, and at least one of at least a partial list of the zone membership of at least one of the TE zones and the master controller to at least one of the SDN controllers comprises instructions to transmit a list of the zone membership of a first TE zone to a corresponding first local zone TE controller, wherein the first zone comprises one of the TE zones, wherein the first local zone TE controller uses the list of the zone membership of the first TE zone to invite the members of the first TE zone to join the first TE zone.

35. The network component of claim 34, wherein the programming further comprises instructions to:
receive an acknowledgement of successful installation of the first TE zone from the corresponding first local zone TE controller.

36. The network component of claim 35, wherein the programming further comprises instructions to:
transmit at least a partial zoning decision to the master TE controller after receiving an acknowledgment of successful installation of each of the plurality of TE zones.

37. The network component of claim 36, wherein the partial zoning decision comprises an identification of each local zone TE controller, a respective zone corresponding to each local zone TE controller, and an identification of at least some of the members of each TE zone.

38. The network component of claim 37, wherein the identification of at least some of the members of each TE zone comprises an identification of border nodes of each of the TE zones and of links shared between at least two TE zones.

39. The network component of claim 21, wherein at least one of the TE zones comprise a plurality of TE sub-zones, wherein a local zone TE controller for the at least one of the TE zones comprises a master controller to the plurality of TE sub-zones.

40. The network component of claim 39, wherein a zoning scheme used to determine the plurality of TE sub-zones is different from the zoning scheme used to determine the TE zones.

41. A method in a zoning controller for dynamic zoning of a network for traffic engineering (TE) in software defined networking (SDN), the method comprising:
receiving at the zoning controller network zoning information from at least some of a plurality of SDN controllers in the network, the network zoning information includes traffic flow information for nodes in the network;
partitioning, in response to detection of a trigger comprising at least one of a change in traffic behavior in the network, a change in topology, a change in node capability, a change in a node state, a change in a buffer status, a change in delay statistics, and a change in available bandwidth, with the zoning controller, the network into a plurality of zones;
selecting a master TE controller from the plurality of SDN controllers;
selecting a plurality of local zone TE controllers from the plurality of SDN controllers, wherein each local zone TE controller corresponds to a respective one of the plurality of zones;
transmitting from the zoning controller an installation command to at least one zone TE controller; and
receiving at the zoning controller an acknowledgement from the at least one zone TE controller confirming successful installation of one of the plurality of zones.

42. The method of claim 41, further comprising:
collecting installation acknowledgments from the local zone TE controllers; and
transmitting zoning strategy and zoning decision to the master TE controller.

43. The method of claim 42, wherein the zoning strategy and zoning decision comprise feasibility, zoning strategy, local zone TE controller identities, and zone borders.

44. The method of claim 41, wherein the master TE controller comprises one of the local zone TE controllers.

45. The method of claim 41, wherein the installation command causes the at least one zone TE controller to transmit member invitations to network nodes identified as belonging to a corresponding TE zone to the at least one zone TE controller.

46. The method of claim 45, wherein the acknowledgement from the at least one zone TE controller is transmitted to the zoning controller by the at least one zone TE controller after receipt of invitation acknowledgements from the members of the TE zone for which the at least one zone TE controller transmitted member invitations.

47. The method of claim 41, wherein the network zoning information comprises at least one of control plane topology, data plane topology, and traffic flow information.

48. The method of claim 47, wherein the control plane topology comprises at least one of controller candidates, data plane devices, user equipment (UEs), direct logical links between controller candidates, direct logical links between data plane devices and controller candidates, and direct logical links between UEs and controller candidates.

49. The method of claim 47, wherein the data plane topology comprises at least one of data plane devices as nodes, physical links, capacity, loading, and spectral efficiency (SE).

50. The method of claim 47, wherein traffic flow information comprises at least one of per flow routing path candidates and per flow routing path parameters.

51. A zoning controller for dynamic zoning of a network for traffic engineering (TE) in software defined networking (SDN), the zoning controller comprising:
 a processor; and
 a computer readable storage medium storing programming for execution by the processor, the programming including instructions to:
  receive network zoning information from at least some of a plurality of SDN controllers in the network, the network zoning information includes traffic flow information for nodes in the network;
  partition, in response to detection of a trigger comprising at least one of a change in traffic behavior in the network, a change in topology, a change in node capability, a change in a node state, a change in a buffer status, a change in delay statistics, and a change in available bandwidth, the network into a plurality of zones;
  select a master TE controller and a plurality of local zone TE controllers from the plurality of SDN controllers, wherein each local zone TE controller corresponds to a respective one of the plurality of zones;
  transmit an installation command to at least one zone TE controller; and
  receive an acknowledgement from the at least one zone TE controller confirming successful installation of one of the plurality of zones.

52. The zoning controller of claim 51, wherein the programming further comprises instructions to:
 collect installation acknowledgments from the local zone TE controllers; and
 transmit zoning strategy and zoning decision to the master TE controller.

53. The zoning controller of claim 52, wherein the zoning strategy and zoning decision comprise feasibility, zoning strategy, local zone TE controller identities, and zone borders.

54. The zoning controller of claim 51, wherein the master TE controller comprises one of the local zone TE controllers.

55. The zoning controller of claim 51, wherein the installation command causes the at least one zone TE controller to transmit member invitations to network nodes identified as belonging to a corresponding TE zone to the at least one zone TE controller.

56. The zoning controller of claim 55, wherein the acknowledgement from the at least one zone TE controller is transmitted to the zoning controller by the at least one zone TE controller after receipt of invitation acknowledgements from the members of the TE zone for which the at least one zone TE controller transmitted member invitations.

57. The zoning controller of claim 51, wherein the network zoning information comprises at least one of control plane topology, data plane topology, and traffic flow information.

58. The zoning controller of claim 57, wherein the control plane topology comprises at least one of controller candidates, data plane devices, user equipment (UEs), direct logical links between controller candidates, direct logical links between data plane devices and controller candidates, and direct logical links between UEs and controller candidates.

59. The zoning controller of claim 57, wherein the data plane topology comprises at least one of data plane devices as nodes, physical links, capacity, loading, and spectral efficiency (SE).

60. The zoning controller of claim 57, wherein traffic flow information comprises at least one of per flow routing path candidates and per flow routing path parameters.

* * * * *